(12) United States Patent
Dorfman

(10) Patent No.: US 10,525,373 B2
(45) Date of Patent: Jan. 7, 2020

(54) ATMOSPHERIC WATER GENERATOR SYSTEM AND METHOD

(71) Applicant: Skywell, LLC, Los Angeles, CA (US)

(72) Inventor: Ronald M. Dorfman, Los Angeles, CA (US)

(73) Assignee: Skywell, LLC, Los Angeles, CA (US)

( * ) Notice: Subject to any disclaimer, the term of this patent is extended or adjusted under 35 U.S.C. 154(b) by 0 days.

(21) Appl. No.: 15/777,646

(22) PCT Filed: Apr. 13, 2017

(86) PCT No.: PCT/US2017/027506
§ 371 (c)(1),
(2) Date: May 18, 2018

(87) PCT Pub. No.: WO2017/180927
PCT Pub. Date: Oct. 19, 2017

(65) Prior Publication Data
US 2018/0369713 A1    Dec. 27, 2018

Related U.S. Application Data

(60) Provisional application No. 62/321,750, filed on Apr. 13, 2016.

(51) Int. Cl.
*B01D 5/00* (2006.01)
*F24F 3/16* (2006.01)

(52) U.S. Cl.
CPC .... *B01D 5/0006* (2013.01); *F24F 2003/1667* (2013.01)

(58) Field of Classification Search
CPC .................. B01D 5/006; F24F 2003/1667
See application file for complete search history.

(56) References Cited

U.S. PATENT DOCUMENTS

| | | |
|---|---|---|
| 2,996,897 A | 8/1961 | Grimes |
| 4,255,937 A | 3/1981 | Ehrlich |

(Continued)

FOREIGN PATENT DOCUMENTS

| | | |
|---|---|---|
| AU | 20080202279 A1 | 12/2008 |
| CA | 2341106 C | 10/2001 |

(Continued)

*Primary Examiner* — David J Teitelbaum
(74) *Attorney, Agent, or Firm* — Lance M. Pritikin

(57) ABSTRACT

Systems and methods are disclosed which enable an atmospheric water generator to measure a variety of water quality parameters throughout its subsystems and conduits, and implement corresponding response protocols when the measurements deviate from their normal ranges. The ranges may be reprogrammable locally at the generator or remotely from the generator. The response protocols may include self-cleaning regimes to help quickly and efficiently bring deviant measurements back into their normal ranges. Generator notification, alarm and shutdown protocols may be implemented when the measurements reach unsafe values, in order to protect the consumer and ensure their ongoing confidence in the quality of the water dispensed from the generator. Subsystems are also described which improve the operational efficiency of the generator, keep the cold dispensing line clear of bacteria, and maximize the useful life of UV bulbs within the water collection and cold storage tanks.

2 Claims, 9 Drawing Sheets

(56) References Cited

U.S. PATENT DOCUMENTS

| | | |
|---|---|---|
| 4,415,797 A | 11/1983 | Choustoulakis |
| 5,038,752 A | 8/1991 | Anson |
| 5,106,512 A | 4/1992 | Reidy |
| 5,149,446 A | 9/1992 | Reidy |
| 5,203,989 A | 4/1993 | Reidy |
| 5,259,203 A | 11/1993 | Engel et al. |
| 5,301,516 A | 4/1994 | Poindexter |
| 5,398,517 A | 3/1995 | Poindexter |
| 5,553,459 A | 9/1996 | Harrison |
| 5,669,221 A | 9/1997 | LeBleu et al. |
| 5,701,749 A | 12/1997 | Zakryk |
| 5,766,453 A | 6/1998 | Morellato et al. |
| 5,845,504 A | 12/1998 | LeBleu |
| 5,857,344 A | 1/1999 | Rosenthal |
| 6,029,461 A | 2/2000 | Zakryk |
| 6,058,718 A | 5/2000 | Forsberg et al. |
| 6,182,453 B1 | 2/2001 | Forsberg |
| 6,209,337 B1 | 4/2001 | Edwards |
| 6,212,959 B1 | 4/2001 | Perkins |
| 6,237,352 B1 | 5/2001 | Goodchild |
| 6,289,689 B1 | 9/2001 | Zakryk |
| 6,490,879 B1 | 12/2002 | Lloyd et al. |
| 6,505,477 B1 | 1/2003 | Smith et al. |
| 6,588,225 B1 | 7/2003 | Hodgson et al. |
| 6,644,060 B1 | 11/2003 | Dagan |
| 6,684,648 B2 | 2/2004 | Faqih |
| 6,705,104 B2 | 3/2004 | Tani et al. |
| 6,755,037 B2 | 6/2004 | Engel et al. |
| 6,779,358 B2 | 8/2004 | Zakryk et al. |
| 6,988,641 B2 | 1/2006 | Jones et al. |
| 7,000,410 B2 | 2/2006 | Hutchinson |
| 7,089,763 B2 | 8/2006 | Forsberg et al. |
| 7,272,947 B2 | 9/2007 | Anderson et al. |
| 7,357,001 B2 | 4/2008 | Yoon |
| 7,373,787 B2 | 5/2008 | Forsberg et al. |
| 7,540,167 B2 | 6/2009 | Murphy et al. |
| 7,779,643 B2 | 8/2010 | Simons |
| 7,861,544 B2 | 1/2011 | Ferreira et al. |
| 7,886,557 B2 | 2/2011 | Anderson et al. |
| 7,954,335 B2 | 6/2011 | Hill et al. |
| 8,028,536 B2 | 10/2011 | Morgan et al. |
| 8,075,652 B2 | 12/2011 | Melikyan |
| 8,302,412 B2 | 11/2012 | Tieleman et al. |
| 8,398,733 B2 | 3/2013 | Melikyan |
| 8,607,583 B2 | 12/2013 | Morgan et al. |
| 8,627,673 B2 | 1/2014 | Hill et al. |
| 8,650,892 B2 | 2/2014 | Ferreira et al. |
| 8,816,300 B1* | 8/2014 | Walker .................. C02F 1/325 210/192 |
| 8,943,843 B2 | 2/2015 | Haryanto et al. |
| 2002/0011075 A1 | 1/2002 | Faqih |
| 2002/0143860 A1 | 10/2002 | Catan |
| 2002/0194069 A1 | 12/2002 | Thakur et al. |
| 2005/0103615 A1* | 5/2005 | Ritchey ................ B01D 5/0006 203/10 |
| 2005/0284167 A1 | 12/2005 | Morgan et al. |
| 2006/0011144 A1 | 1/2006 | Kates |
| 2006/0165060 A1 | 7/2006 | Dua |
| 2007/0119768 A1* | 5/2007 | Duplessis ............... C02F 1/008 210/252 |
| 2007/0175234 A1 | 8/2007 | Pruitt |
| 2007/0209984 A1 | 9/2007 | Lev et al. |
| 2008/0184720 A1 | 8/2008 | Morgan et al. |
| 2008/0276630 A1 | 11/2008 | Lukitobudi |
| 2009/0029769 A1 | 1/2009 | Muller |
| 2009/0077992 A1 | 3/2009 | Anderson et al. |
| 2010/0005825 A1 | 1/2010 | Yui |
| 2010/0083676 A1 | 4/2010 | Merritt |
| 2010/0307181 A1 | 12/2010 | Max |
| 2011/0147194 A1 | 6/2011 | Kamen et al. |
| 2011/0283730 A1 | 11/2011 | Tudor |
| 2012/0048119 A1 | 3/2012 | Morgan et al. |
| 2012/0060531 A1 | 3/2012 | Ferreira et al. |
| 2013/0008196 A1 | 1/2013 | Poyet |
| 2013/0042642 A1 | 2/2013 | Ferreira et al. |
| 2013/0047655 A1 | 2/2013 | White |
| 2013/0209972 A1 | 8/2013 | Carter et al. |
| 2013/0333405 A1 | 12/2013 | Belady et al. |
| 2013/0337120 A1* | 12/2013 | Sabates, III ......... A47J 31/4403 426/231 |
| 2014/0231348 A1 | 8/2014 | Sackstein |
| 2016/0333553 A1 | 11/2016 | Dorfman |

FOREIGN PATENT DOCUMENTS

| | | |
|---|---|---|
| CA | 2926818 A1 | 4/2015 |
| CN | 103750745 | 4/2014 |
| EP | 1852131 B1 | 10/2010 |
| EP | 2607323 A1 | 6/2013 |
| EP | 2918929 A1 | 9/2015 |
| JP | H05174036 A | 7/1993 |
| JP | 2007233769 A | 9/2007 |
| KR | 100735515 B1 | 6/2007 |
| KR | 100884905 B1 | 2/2009 |
| KR | 20100058947 A | 6/2010 |
| WO | 2011117841 A1 | 9/2011 |
| WO | 2011135403 A1 | 11/2011 |
| WO | 2012009024 A1 | 1/2012 |
| WO | 2012165775 A2 | 12/2012 |
| WO | 2014203634 A1 | 12/2014 |
| WO | 2015054435 A1 | 4/2015 |

\* cited by examiner

| | Measurement location | Unit Alarm Limits | Normal Operating Range | Self Cleaning Range |
|---|---|---|---|---|
| pH | After filters | < 4.00<br>> 10.0 | 6.5 - 8.0 | 4.0 - 6.5<br>8.0 - 10.0 |
| Pressure | Before and after filters | 120 PSI | 65 - 100 PSI | 100 - |
| Flow | Before and after filters | <0.2 GPM | 0.3 - 0.5 GPM | 0.2 |
| UV sensor | In cold and collection tank | < 80 micro W/cm2 | 100 - 500 microW/cm2 | 80 - 100 microW/cm2 |
| TDS | Before Dispense | >100 ppm | 20 - 70 ppm | 70 - 100 ppm |
| ORP | At dispense | Negative for non-alkaline water | Positive >300mV for non-alkaline water | N/A |
| DO | After filters | <4 mg/L at 25oC | 5.0 - 6.5 mg/L | 4.0 - |

FIG. 6

ATMOSPHERIC WATER GENERATOR SYSTEM AND METHOD

RELATED APPLICATIONS

This application is a U.S. National Stage of International Application No. PCT/US17/27506, filed on Apr. 13, 2017, which claims the benefit of U.S. Provisional Application No. 62/321,750 filed Apr. 13, 2016. All of the above-identified applications are hereby incorporated by reference in their entireties as though fully and completely set forth herein.

TECHNICAL FIELD

The systems and methods described and claimed herein relate generally to devices for capturing atmospheric water and dispensing such water in liquid, potable form.

BACKGROUND

Systems for converting atmospheric moisture into potable drinking water have existed for decades. However, improvements are still needed which will increase the operational efficiencies of the system, the consumer's confidence in the cleanliness of the water dispensed therefrom, and the user's ability to control and interface with the system in accordance with their unique preferences.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 6 is a table illustrating example programmed ranges to be compared against measurement data from water quality meters of various types disposed throughout an atmospheric water generator system;

DETAILED DESCRIPTION OF THE PREFERRED EMBODIMENTS

Figures 1, 2:
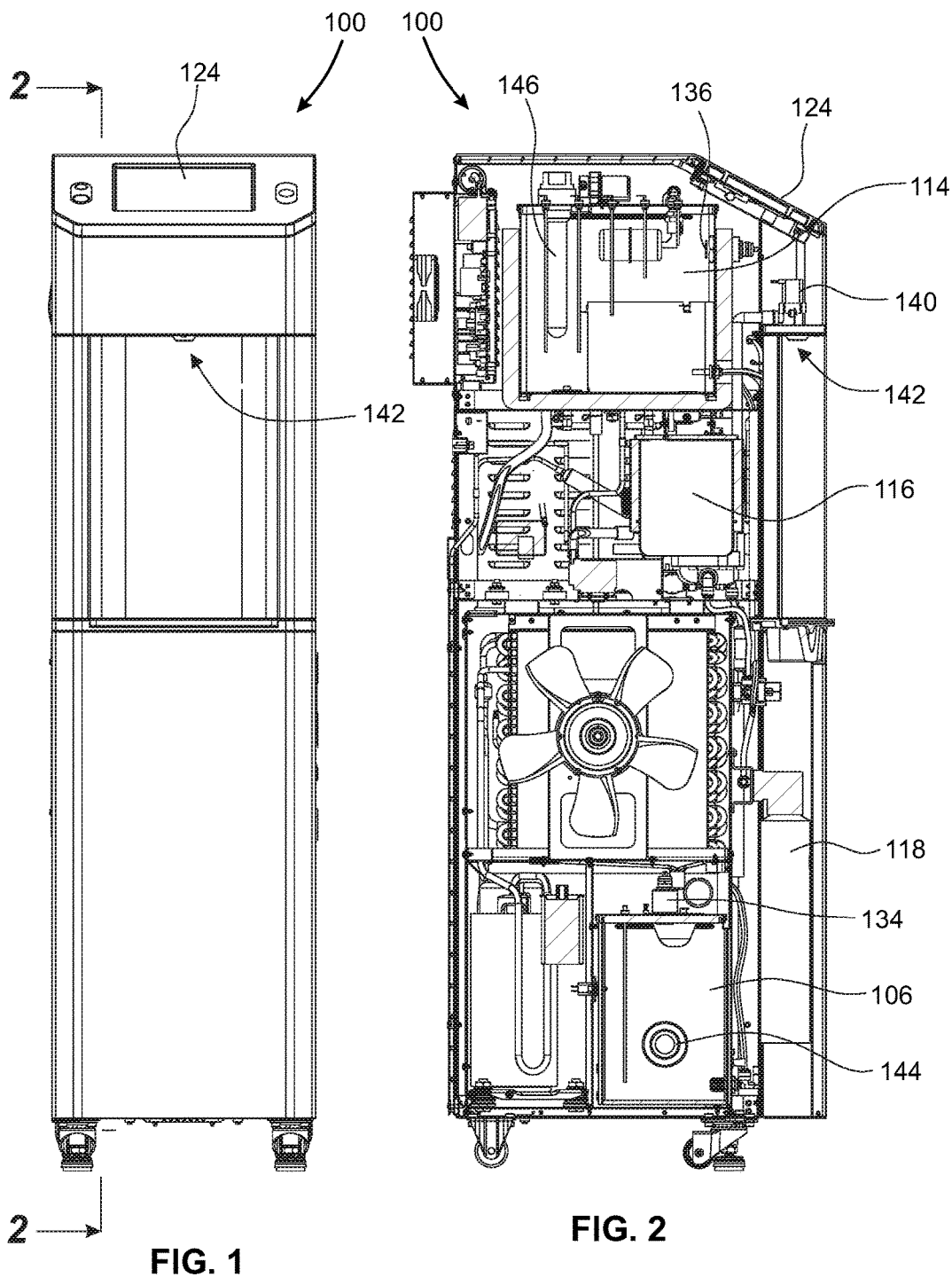
FIG. 1 is a diagrammatic front view of a smaller-capacity atmospheric water generator system in accordance with one non-limiting embodiment of the present invention.
FIG. 2 is a diagrammatic cross-sectional view taken at line 2-2 of FIG. 1.
Figures 3, 4:
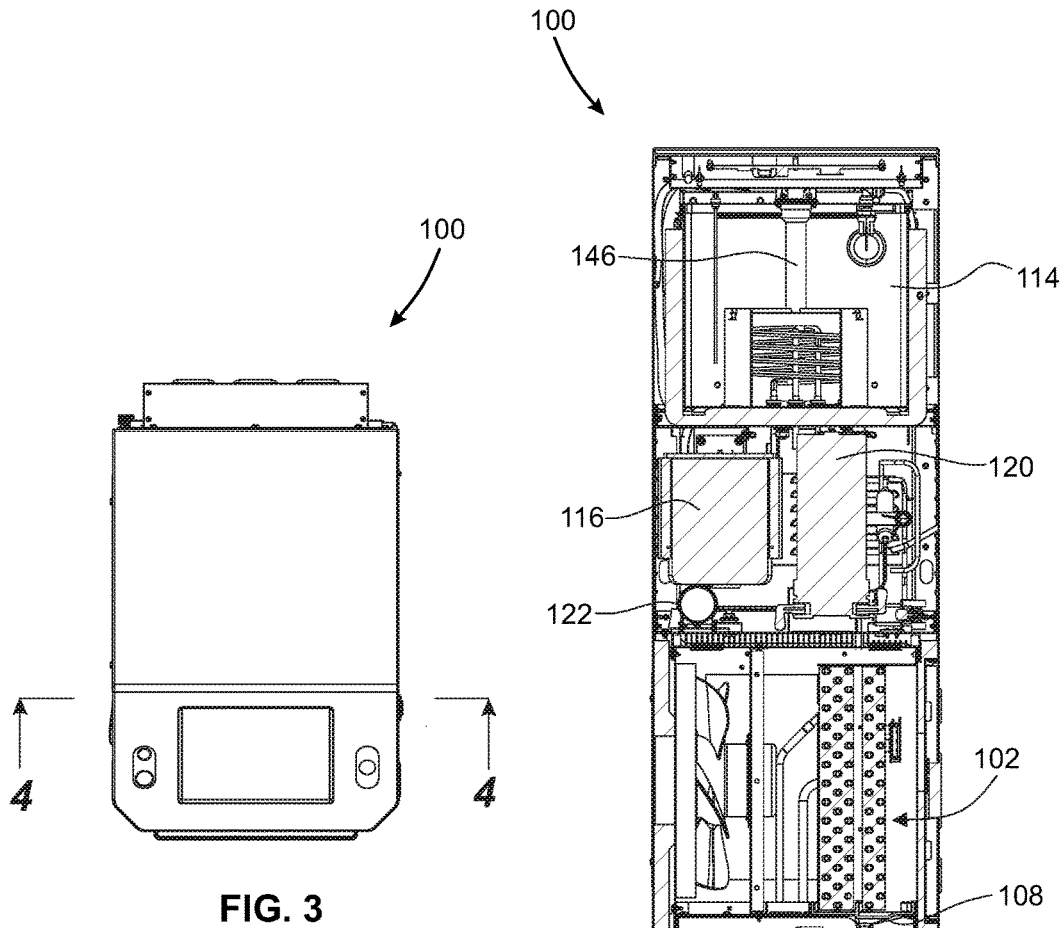
FIG. 3 is a diagrammatic top view of the atmospheric water generator system of FIG. 1.
FIG. 4 is a diagrammatic cross-sectional view taken at line 4-4 of FIG. 3.

FIGS. 1-4 and 11 depict example embodiments of atmospheric water generators (AWGs) in accordance with the present disclosure. While the improvements described below and depicted in the several figures may initially be presented in the context of either a smaller-capacity AWG system (e.g., the 5-gallon home/office system depicted at 100 in FIGS. 1-4) or a larger-capacity AWG system (e.g., the 100-gallon system depicted at 300 in FIG. 11), it is envisioned that all such improvements may be equally or partially applicable to both smaller and larger-capacity systems.

AWGs may comprise a water production element that uses a refrigeration cycle to cool incoming ambient air sufficiently to cause moisture in the air to condense and collect as liquid water on the evaporator coils 102. One or more fans (see, for example, fans 108 and 110) are generally relied on to move the air into and through the AWG. The liquid water formed on the evaporator coils 102 generally drips into a collection pan 108 and is directed to a collection tank 106 where it is initially stored. Eventually, the collected water is processed for dispensing from the AWG by way of, for example, solenoid dispense valves 140 and one or more dispense nozzles 142. Such processing may include, for example, passing the liquid water through one or more filters 118, cooling liquid water in a cold tank 114, heating the liquid water in a hot tank 116. A boost pump 120 and a hot water pump 122 may be provided to facilitate movement of the liquid water through respective portions of the AWG system. In certain embodiments of the AWG system 100, a tablet interface 124 may be provided to display information (e.g., water quality and alert information) to the user or administrator of the AWG system, and to allow the user or administrator to conveniently input data and modify parameters of the AWG system.

Condensed water leaving the surface of evaporator coils 102 in an AWG machine generally starts out as highly pure, chemical and contaminant free, liquid water, in stark contrast with ground water used as a municipal water source. A chronic problem associated with conventional portable AWG units, both real and perceived by the user, is the challenge of keeping the condensed water from developing contamination while stored or moved within the AWG unit, whether in the form of biological/bacterial, or VOC/chemical/metal dissolved or un-dissolved contamination.

Notably, consumers do not typically fear bacterial contamination from municipal water being dispensed out of the tap, due in part to the administration of Chlorine at the municipal treatment plant, although there is an increasing concern over other post-treatment contamination, which may introduce lead. However, consumers do tend to, and are anticipated to in the future, fear bacterial contamination from AWG machine water.

From condense to dispense, the areas or stages susceptible to contamination within conventional AWG machines include the following: (1) bacteria growth in the collection tank from the introduction of organic matter from the outside (e.g., hair, dust, Volatile Organic Compounds (VOCs), bugs, etc.). Such organic matter is the food needed for bacteria to thrive. Metallic contamination in the collection tank can also occur due to the introduction of acids from ambient conditions which can make the water acidic, resulting in the stripping of metallic and plastic content from tanks and lines; (2) bacteria growth resulting in bio-fouling at the water filter stage (e.g., too much biologic contamination may overwhelm the filters' ability to do their job); and (3) biologic or chemical contamination in the cold/storage tank (e.g., when stored water remaining stagnant over several days of non-use the AWG machine becomes highly hospitable to bacteria growth.

A primary objective of certain systems, subsystems and features disclosed herein is to allow monitoring of the prevailing conditions throughout the AWG system 100 so in the event "Red Flag" (i.e., out-of-threshold) conditions were to develop, the AWG system would be capable of, for example, preventing itself from dispensing water, and would trigger, for example, an aggressive self-cleaning process until contamination is eradicated, thereby safeguarding the consumer. It is proposed that this is achievable through the use of multiple sensors/meters and a processor element (e.g., one or more CPUs) with programmed threshold parameters.

Figure 5:
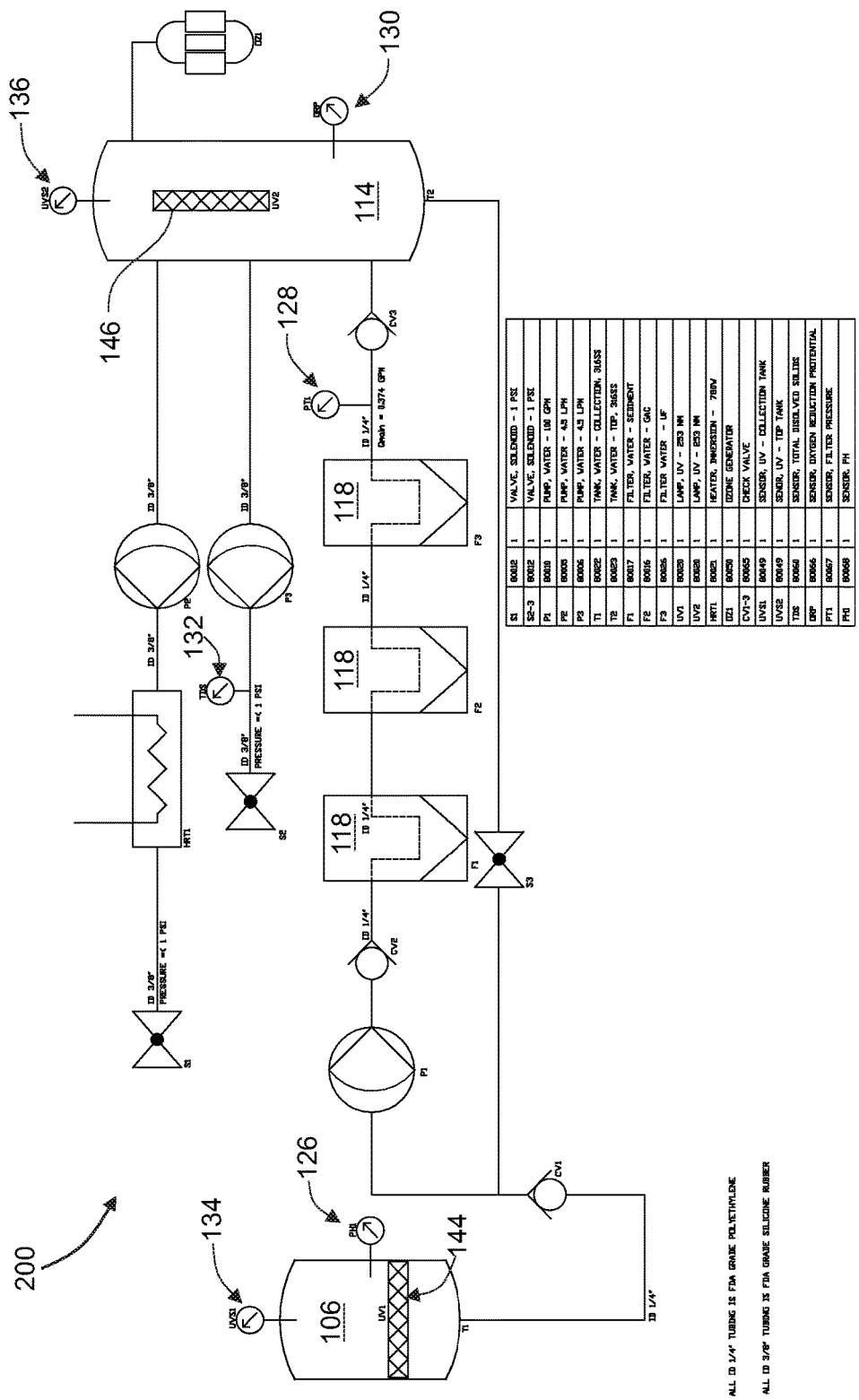
FIG. 5 is a process and instrumentation diagram of one non-limiting embodiment of a water quality monitoring subsystem which may be incorporated within one or more embodiments of an atmospheric water generator system.

FIG. 5 is an example of a process and instrumentation diagram (PI&D) showing the layout of certain preferred water handling components inside the water machine. The suite of sensors or "water quality meters" (e.g., PH1, UVS1, UVS2, ORP, TDS, and/or PT1) are preferably arranged across the water flow path in order to identify water concerns throughout the system and process.

By way of example, a pH meter 126 may be located in the collection tank 106, allowing the AWG system 100 to monitor acidity levels of the condensed and stored water. If the pH levels fall below a pre-determined threshold, the AWG system may be configured to perform, for example, one or more of the following response protocols: (a) shut down (e.g., with a "SERVICE REQUIRED" notification on display 124), (b) recirculate the water in the cold/storage tank, and/or (c) re-mineralize the water. Responses (b) and (c) may have the effect of increasing the alkalinity of the water in the collection tank 106 before it travels downstream.

If the water filters 118 start to get "overrun" by bacteria/bio-fouling, the water leaving the filters (118) likely experiences a drop in flow water pressure. A water pressure monitor (meter) 128 may be located at the downstream side of the filters 118 to detect any drop in water pressure leaving the filters. Should such a drop in pressure be experienced, the AWG system 100 may automatically shut down its ability to dispense water, and the consumer may be notified of the need for service (e.g., the water filters likely need to be replaced before their scheduled lifespan is over).

Prior to traveling through the dispense segment and into the consumer's glass, the water in the cold/storage tank 114 may have already gone through air filters, water filters and been exposed to ozone, recirculation and UV light. Notwithstanding the thoroughness of these protective treatments, sometimes those predicate sanitation processes break down. It is unquestioned that UV exposure is quite effective in containing bacteria growth, provided the initial bacterial growth is given sufficient exposure to the UV light. While the effectiveness of a UV bulb may be ideal early in the bulb's life, over time the bulb effectiveness declines. So even though a UV bulb is still within its published scheduled life, its effectiveness (e.g., light wave intensity) may have been reduced to a level which is inadequate to contain bacteria growth. Consequently, a UV meter may be installed in the top tank 114 which monitors the actual effectiveness of the UV bulb, and should said effectiveness drop below a pre-determined level of intensity, it may trigger a "No Dispense" mode or the like (e.g., instructing the user that service is required). The second meter to be placed in the top tank may be an ORP meter 130 (ORP="Oxidation Reduction Potential"). The ORP meter 130 monitors dissolved oxygen levels in the water. The greater the concentration of biological contamination in the water the less dissolved oxygen will be in the water. ORP levels are a proxy for measuring bacterial activity (e.g., higher levels of coliform counts).

The ultimate measure of the AWG system's ability to keep the water clean, fresh and pure (and therefore manage the confidence level of the water drinking population) is the quality of water that is dispensed into the user's glass. Accordingly, a TDS meter 132 may be installed post-cold-tank, for example, at the mouth of the dispense nozzle 142. If the total dissolved solids of water about to be dispensed is above a certain prescribed level, the system 100 may go into a "NO Dispense" mode (or the like), and a SERVICE NEEDED instruction (or the like) may be displayed.

FIG. 6 is one example of a table correlating meter types, measurement locations, and measurement values which may be programmed into the computational and data processing elements of the AWG system 100. When a meter (e.g., pH meter, pressure meter, etc.) produces a respective measured value which is outside of its normal operating range (i.e., "acceptable ranges"), one or more response protocols will be triggered. Such programmed values may be modifiable locally or remotely (e.g., via the AWG system 100 being connected to a network, e.g. a LAN, WAN or the Internet). The values shown in FIG. 6 are for example only and may be varied depending up on the particular embodiment of the AWG system. Should any or multiple measured values be determined to be outside the corresponding programmed acceptable range (i.e., thresholds), a self-cleaning response may be triggered, including, but not limited to, a pre-set water recirculation regimen, the duration and intensity of which may be dependent on the particular measurement location and degree to which the detected value falls outside the normal operating range (i.e., acceptable range).

In certain preferred embodiments, if the measured value exceeds the "Unit Alarm Limits" the machine will shut down and lock out the customer from dispensing water. The "Normal Operating Range" is the range of values commonly expected during uneventful operation of the machine. If the measured quantities exceed the "Normal Operating Range" but have not yet reached the "Unit Alarm Limits" then the machine will begin a self-cleaning operation. While measured values are within the "Self Cleaning Range" the machine will adjust operations in an effort to automatically correct the condition and move the deviated measured values back into the "Normal Operating Range."

The pressure drop after the filters and flow decrease may be a sign of fouled filters and can be addressed as a multi-sensor effect. Dissolved Oxygen (DO) drop after the filters is a sign of bacterial growth, and along with pH decrease to less than 4 can be a sign of H2S production in the system. This condition may trigger a filter change alert, or result in the application of ozone and recirculation to re-oxygenize the system, and prevent biofouling in the filters.

Some preferred embodiments of an improved AWG system 100 may implement one or more of a TDS meter 132 at the output, a UV sensor 134 n the collection tank 106, a UV sensor 136 in the cold tank 114, a water system and quality assurance indication, a water recirculation regime, and pulsed-source output water temperature management subsystem. The implementation of such features may be particularly useful in smaller-capacity home/office AWG systems, in that they could provide the drinking public with more immediate reassurance and confidence that the water being dispensed directly from the AWG system is in fact safe, clean and fresh.

Embodiments of an atmospheric water generator 100 for operating in an environment with ambient air and generating potable water therefrom may comprise: (a) a water production element configured to transform water vapor from the ambient air to liquid water; (b) a collection tank 106 for collection and storage of the liquid water; (c) a dispense outlet section 142 for outputting dispensed volumes of the liquid water; (d) two or more water quality meters disposed in water-measurement communication between the collection tank 106 and water outlet section; and (e) a processor element. The processor element, which may comprised one or more processors, may be configured to (i) compare measured values from each water quality meter to corresponding programmed acceptable ranges, thereby identifying any measured value falling outside of its respective programmed acceptable range; (ii) determine which one or more of at least two distinct response protocols is to occur based on which measured value falls outside of its corresponding programmed acceptable range; and (iii) cause the atmospheric water generator to perform at least one of the response protocols when measured values from one or more of the water quality meters falls outside of the respective programmed acceptable range.

In certain embodiments of the generator 100, one of the response protocols includes triggering a filter-change alert. Additionally or in the alternative, one of the response protocols includes preventing the atmospheric water generator from dispensing liquid water.

One of the response protocols preferably includes a self-cleaning response, duration and intensity of the self-cleaning response being dependent upon one or both of (a) which of the water quality meters is generating the measured value falling outside of the respective programmed acceptable range; and (b) degree to which the measured value falls outside of the respective programmed acceptable range. The self-cleaning response may include a water recirculation regimen. The recirculation regimen may involve the introduction of ozone into the recirculated water.

The programmed acceptable ranges and unit alarm limits may be locally modifiable by way of, for example, a graphic user interface 124 of the atmospheric water generator 100, or may be remotely modifiable by way of network connection with the atmospheric water generator 100.

At least one of the water quality meters may be a UV meter for measuring the intensity of UV light emitted within the collection tank 106 or top (e.g., cold) tank 114. Moreover, the AWG may comprise a water filter element 118 having an upstream side and a downstream side, wherein at least one of the water quality meters is a water pressure meter 128 for measuring water pressure at the downstream side of the water filter or filters 118. A water filter element 118 may comprise a set of individual filters, such as a sediment and UF filter. At least one of the water quality meters may also be selected from the group consisting of (a) a pH meter 126 for measuring an acidity level of the liquid water stored in the collection tank 106; (b) an ORP meter 130 for measuring a dissolved oxygen level of liquid water within the top tank; and (c) a TDS meter 132 for measuring total dissolved solids in liquid water flowing from the top tank 114 to a dispense valve 140.

TDS Meter/Sensor

Conventional atmospheric water generators frequently use filters as part of the process to remove the impurities from the water. These filters typically have a breakthrough time at the beginning of their use. Consumers are usually unable to track or verify when the filter breakthrough time has elapsed. As a result, they cannot be sure how long the dispensed water should be discarded until the water is suitable for drinking. Over-disposing or under-disposing of the produced water is a major issue with new filters.

Moreover, filter fouling frequently occurs in systems that use water filters. Environmental parameters including temperature, input water quality (e.g. turbidity) and rate of bacterial growth have a major effect on the rate of filter fouling. The recommended fouling time by the manufacturer might not be applicable in all different water conditions. This could result in unsafe water being used by the consumer. On the other hand, in a system with very high water quality at the input, filters might last longer than the recommended time indicated by the manufacturer. Premature replacement of the filters is highly cost-inefficient.

At the beginning of the filter usage, during the breakthrough period, the TDS of the filtered water is typically very high (e.g., as high as 800 ppm). As the water passes through the filter, this number will decrease to a much lower number depending on the influent water quality. A TDS meter positioned right before the dispense outlet 142 can alarm the user regarding water quality and prevent them from using this water. It may also help the consumer to know how much water to discard until the system is dispensing good-quality water.

As the filters fill up and foul, the TDS is gradually increasing. Positioning the TDS meter before dispense can warn the user of the water quality and the need for filter change, which could be before or after recommended time by the manufacturer, depending on the water quality.

A TDS meter 132 may be disposed, for example, just prior to the dispensing outlet 142, in order to monitor the foreign body titer (concentration) in the water being dispensed. This titer measurement may be a proxy for impurity build-up common from biofilm fouling, bacteria growth, a combination thereof or the like. In the event that the TDS levels rise to a certain pre-determined level, the system may be programmed or otherwise configured to stop dispensing water. In addition or in the alternative, a "maintenance" light may be displayed on the system's display (e.g., touchscreen) 124.

Figure 7:
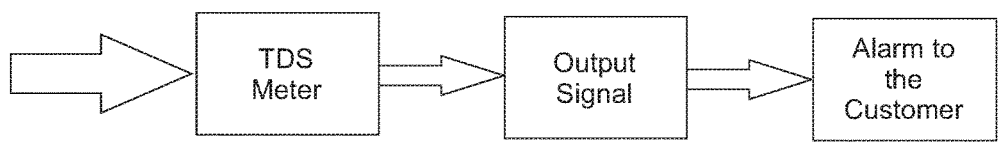
FIG. 7 is a flow chart illustrating an example result of total dissolved solids (TDS) meter measured data exceeding its corresponding acceptable range, resulting in user or administrator notification or other response protocols.

Referring to FIG. 7, in one or more embodiments of an AWG system 100, a TDS meter 132 may be configured to measure the TDS level before dispense and compare it to a preset value which indicates a good water quality level. If the level is higher than the preset value, an alarm may be sent, and the user will be informed.

Thus, one or more TDS meters 132 may be deployed to monitor the "debris" present in the water during the initial water filter break-in period, as well as to monitor the build-up of "stuff" in the water downstream from the filter stage due to bio-fouling of the filters during their effective lifetimes.

In-Tank UV Bulb and UV Sensor

Ultra-Violet (UV) has frequently been used in water industry to sanitize the water. Conventional UV systems are typically installed in a tube or a channel within which water flows, to sanitize the water as it flows past the UV light source. One deficiency of such systems is that the effectiveness of the UV capability to kill the bacteria and sanitize the water is highly variable depending upon the water quality (especially turbidity level), the contact time between the UV light and the water, and the intensity of the UV emissions. UV dose, which may be defined as the UV bulb intensity multiplied by the time that water was exposed with UV, is an indicator of the water quality and level of bacterial protection. The UV dose received by the water can change as the water quality changes, and with UV bulb aging. This affects the water quality drastically, and the growth of biofilm may be observed in areas of an AWG machine system that fail to provide a sufficient proper UV dosage.

Referring to FIGS. 2, 4, 9 and 8, in certain preferred embodiments of an AWG system, biofilm and bacterial control in storage tanks may be provided by mounting a stationary UV bulb (e.g., 144 or 146) directly inside the respective tanks. Such a confirmation provides the maximum contact time (i.e., highest possible UV dose based on the UV bulb intensity) for the produced and stored water. This high dose of UV not only keeps the quality of the produced water intact, but it also prevents biofilm formation in the storage tank. Moreover, UV sensors (e.g., 134 and 136) are preferably installed in the respective tanks to continuously control the UV dose within the system.

A UV sensor may be disposed in the cold/storage tank to monitor the effectiveness of the UV bulb located in that tank. Notably, as a UV bulb ages, its spectrum may decrease and therefore the bulb may become less effective at killing bacteria and viruses. The installation of a UV sensor in the tank with the UV bulb helps ensure that the particular UV bulb within the tank is proving an acceptable level of UV output. In contrast, conventional AWG machines may rely exclusively on time lapse programming to notify the operator of the machine to change out the UV bulb at the end of a specified period of use, irrespective of the volume of water having passed through the tank since the last replacement of the bulb, or actual real-time effectiveness of the currently-installed UV bulb. With the currently-disclosed improvement, in the event that the UV bulb effectiveness drops below a certain pre-determined level, the system may be programmed or otherwise configured to stop dispensing water In addition or in the alternative, a "maintenance" light may be displayed on the system's display (e.g., touchscreen) 124.

Figure 8:
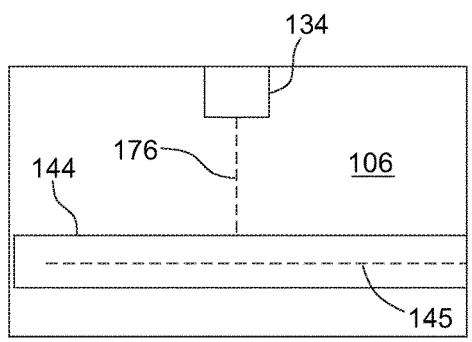
FIG. 8 is a diagrammatic cross-sectional view of an example water collection tank with a UV bulb and UV sensor disposed therein.

With reference to FIG. 8, a UV bulb 144 in the collection tank 106 may be oriented horizontally in the tank, and the corresponding UV sensor 134 may be located perpendicular to the UV bulb. The sensor may preferably be located at or point toward the middle of the bulb's length and may face directly toward the bulb to receive the highest intensity of the UV light. Horizontal orientation allows coverage of the whole water tank so as to ensure there is no shadow in the box, and eliminates any possible bacterial growth. UV light not only kills all forms of bacteria, but it helps keep the whole tank sanitized and prevents bacterial growth.

Figure 9:
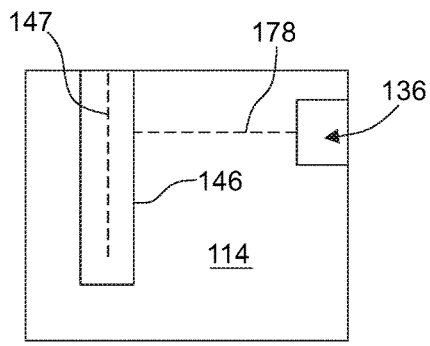
FIG. 9 is a diagrammatic cross-sectional view of an example cold water tank with a UV bulb and UV sensor disposed therein.

With reference to FIG. 9, the UV bulb 146 in the cold tank 114 may be vertically oriented in the cold tank, and possible distanced from the nearest wall of the tank by about ¼-⅓ the width of the tank 114 (see, e.g., FIG. 2). The corresponding UV sensor 136 may be connected to the tank in a horizontal orientation. The sensor location may preferably be perpendicular to the bulb, so as to increase the received wavelength and avoid angular distortion.

With a UV bulb introduced in the tank along with a corresponding UV sensor(s), the intensity and effectiveness of UV emissions can be verified and monitored at different temperatures and water levels. In turn, this results in a cleaner system which keeps the water consistently free of microbes, and bacterial secretions that can negatively affect water flavor and odor.

Embodiments of an atmospheric water generator 100 for operating in an environment with ambient air and generating potable water therefrom, may comprise: (a) a water production element configured to transform water vapor from the ambient air to liquid water; (b) a first tank for storage of the liquid water; (c) a UV emitter configured to emit UV light within the first tank; (d) a UV sensor configured to measure the intensity of the UV light emitted from the UV emitter; and (e) a UV controller configured to perform a UV dosing process The UV dosing process may comprise: (i) establishing a target UV dosage; (ii) activating the UV emitter; (iii) receiving a measured intensity from the UV sensor; (iv) calculating an activation period based on the measured intensity and the target UV dosage; and (v) deactivating the UV emitter upon completion of the UV activation period.

The UV controller may be configured to cause the UV dosing process to repeat at an interval. The AWG system may further comprise: (a) a second tank for storage of the liquid water; and (b) a water pump 120 configured to pump liquid water from the first tank (e.g., collection tank 106) to the second tank (e.g., cold tank 114). The UV controller may be further configured such that, for each time liquid water is pumped from the first tank to the second tank, the UV controller performs the UV dosing process prior to said pumping.

The UV emitter (e.g., 144 or 146) may me elongated along an emitter axis (e.g., 145 or 147, respectively). The corresponding UV sensor (e.g., 134 or 136) may have a viewing axis (e.g., 178 or 178, respectively). The viewing axis may be disposed perpendicularly to the emitter axis.

Embodiments of an AWG system with in-tank UV bulb may further comprise: (a) a second tank 114 configured to receive water from the first tank 106; (c) a second UV emitter 146 configured to emit UV light within the second tank 114; (d) a second UV sensor 136 configured to measure the intensity of the UV light emitted from the second UV emitter 146; and (e) a second UV controller configured to perform a second UV dosing process. The second UV dosing process may comprise: (i) establishing a second target UV dosage; (ii) activating the second UV emitter 146; (iii) receiving a second measured intensity from the second UV sensor 136; (iv) calculating a second activation period based on the second measured intensity and the second target UV dosage; and (v) deactivating the second UV emitter upon completion of the second UV activation period.

System Operation and Water Quality Assurance Indication

Embodiments of the AWG system 100 may be programmed and/or otherwise configured to display a system operation and water quality assurance indication (e.g., a graphic icon), to provide the consumer with real-time notice of any water quality or system operation deficiencies which could potentially affect the water quality they are about to consume. Such an indication may be, for example, a "TWO THUMBS UP/WATER IS GOOD TO DRINK" assurance icon display on the touchscreen 124 that reflects, for example, that the UV bulbs are working within their optimal prescribed range and the TDS readings of the water are well below any levels that might suggest an unacceptable or undesirable degree of impurities.

Water Recirculation

Atmospheric water generators typically use storage tanks to store the water before dispense. These storage tanks are commonly made of plastic or metal. Plastic containers can leach organic matters including Phthalate (which is a carcinogen) into the water. Metallic containers can leach the metals or possibly coating materials into the water, which can cause taste and odor in the produced water even at concentrations which are below drinking water limits. Stagnant water can be a perfect environment for biofilm formation on the container walls as the biofilm favors stationary water and it cannot form in moving water.

To prevent biofilm formation and remove leached out chemicals from the water, the stored water may be recirculated through a set of filters 118 to remove any chemical and bacteria formation. Embodiments of the presently-described AWG system 100 may be programmed and/or otherwise configured to recirculate water from, for example, the cold and/or storage tank 114, through the various filters and back to the respective tank 114. Such a regime helps prevent water from stagnating on the cold tank 114, and thereby helps avoid the buildup of bacteria in the respective tank. By way of one example, every night from 2:00 am to 6:00 am, the water in the cold tank may be recirculated (e.g., four times) down through the filters 118 and back up into the tank 114. Not only would such a configuration and method keep the water from stagnating in the tank, but running it through the Ultra filter reduces the TOC count in the water which has experimentally shown an extraordinary ability to keep bacteria growth down to nearly zero.

Figure 10:
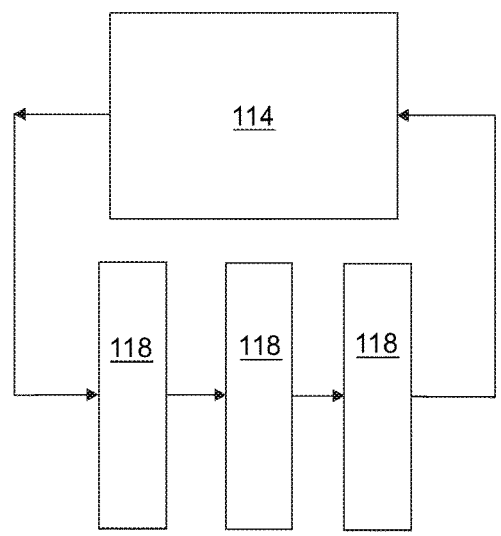
FIG. 10 is a flow chart illustrating the flow of water during one example of a water recirculation protocol, which in certain embodiments of an atmospheric water generator system may be performed on a scheduled or unscheduled basis.

The recirculation of water stored within a tank may involve at least one or more of (a) level sensors to control the water recirculation without the possibility of tank overflow, (b) time controllers to set recirculation time to favorable hours in consideration of, for example, noise abatement and energy costs; (c) flow control devices to provide a controlled circulation of the water; and (d) recirculation may move the stored water through associated filters and back to the main tank (an example embodiment being diagrammatically illustrated in FIG. 10).

Recirculation may be performed on a scheduled or unscheduled basis. It may be performed on an unscheduled basis, for example, whenever the TDS meter 132 detects higher concentrations of total dissolved solids in the water, which may frequently occur after long periods of non-use of the system (e.g., 2-3 days).

Pulsed-Source Output Water Temperature Management Subsystem

Water consumers have their own unique preferences with regard to the temperature water, in both the cold and hot ranges. For example, a very common "ask" has been by people who drink green tea. Apparently green tea is meant to be drunk at lower temperatures than coffee or regular tea.

By employing variably timed solenoid pulses (e.g., controlling the consecutive opening and closing of the cold and then hot solenoids in a series and duration), the AWG system and deliver the exact temperature of water desired by the particular user, on demand and in real time.

By way of example, the hot tank 116 in the AWG system 100 may be set to maintain a hot tank water temperature of 200° F., while the cold tank 114 may be set at 37° F. In conventional water dispensing machines, the user typically either pushes the hot dispense button for hot water (e.g., thereby receiving water at 200° F.) or the cold button for cold water (e.g., thereby receiving water at 37° F.). In critical contrast, the presently-described improvement enables certain preferred embodiments of the AWG system 100 to provide the user with a display option of "demanding" water at a temperature anywhere between the upper hot limit setting on the hot tank and the lower limit then in effect in the cold tank. The user-selected dispensed water temperature is produced by a corresponding pre-calculated set of "open" and "close" impulses being sent to the solenoid valves in the hot and cold lines (e.g., from the upper hot/cold tanks), thereby producing the appropriate concert of opens and closes, resulting in the water being dispensed at the user-selected temperature (e.g., 170° F. for green tea or soup).

Embodiments, of an atmospheric water generator 100 for operating in an environment with ambient air and generating potable water therefrom may comprise: (a) a water production element configured to transform water vapor from the ambient air to liquid water; (b) a cold tank 114 for cooling a refrigerated volume of the liquid water to a cold-water temperature; (c) a hot tank 116 for heating a heated volume of the liquid water to a hot-water temperature, the hot-water temperature being greater than the cold-water temperature; (d) a water dispense outlet 142 at which water is dispensable from the generator 100; (e) a cold valve 140a for controlling the flow of water from the cold tank 114 toward the water dispense outlet 142; (f) a hot valve 140b for controlling the flow of water from the hot tank 116 toward the water dispense outlet; (g) a dispense temperature selection interface (e.g., via interface 124) configured to allow a user of the generator to select a dispense temperature, the selected dispense temperature being between the cold-water temperature and the hot-water temperature; and (h) a dispense temperature controller in electrical communication with the dispense temperature selection interface, and configured to control opening and closing of the hot valve and the cold valve in a coordinated fashion so as to maintain the dispensed liquid water at the selected dispense temperature.

For any selected dispense temperature, the dispense temperature controller may be configured to execute a respective valve command protocol, the valve command protocol dictating respective timings and durations of the opening and closing of the cold and hot valves. The cold valve and the hot valve may each be solenoid valves 140; and the valve command protocol may drive a series of solenoid pulses which are variably-timed between the cold valve and the hot valve. The dispense temperature controller may be configured to calculate the respective valve command protocol following the user's selection of the dispense temperature. The dispense temperature controller may be configured to (a) determine the cold water temperature by way of a cold tank temperature sensor; (b) determine the hot water temperature by way of a hot tank temperature sensor; and (c) calculate the valve command protocol based at least in part on the cold water temperature and the hot water temperature.

The selectable dispense temperature may be within one or more temperature ranges between the cold-water temperature and the hot-water temperature. The dispense temperature selection interface may be configured to display the one or more temperature ranges to the user.

The AWG may comprise a mixing section in fluid-receiving communication with the cold valve and the hot valve, the mixing section may be being configured to blend the water flowing from the cold tank through the cold valve with the water flowing from the hot tank through the hot valve prior to said blended water being dispensed from the generator by way of the water dispense outlet. In such embodiments, the dispense temperature controller may be configured to (i) determine the temperature of the blended water by way of a dispensed water temperature sensor in communication with the mixing section, and (ii) adjust the valve control protocol based at least in part on the temperature of the blended water.

Some preferred embodiments of an improved AWG system may implement one or more of a cool-air redirection subsystem, influent air pre-cooling, and a variable-speed fan. The implementation of such features may be particularly useful in larger-capacity AWG systems (such as the one shown at 300 on FIGS. 11 and 12), in that they could provide significantly improved water-production and bacteriostatic efficiencies.

Redirection of Cool Air

Atmospheric water generation machines create cold air as a byproduct of part of the water condensation process. There are several uses for this cold air, however, it is difficult to take advantage of all of them. For example, one advantage is to force the cold air over the tank to reduce the rate of bacteria growth. Another is the opportunity to move the cold air over the condenser coil. This would reduce the high side pressure on the compressor and correspondingly reduce the power consumption of the machine. Such a configuration and method clearly provides multifold advantages within a compact and cost effective machine Referring to FIGS. 12 and 13, the provision of appropriate vertical offsets 148, horizontal (lateral) free space 150, and baffling 152 using the Coanda Effect within the AWG system enables the cool-air redirection subsystem and method to provide the associated advantages in a relatively small space. The cool-air redirection subsystem and method may direct the cooler air coming off the system's evaporative coils 102 toward the combined collection and storage tank 138. This may result, for example, in the stored water in the tank 138 being maintained below approximately 60 degrees F. Therefore, not only is this subsystem capable of keeping the stored water at a consumer-desirable 55-60-degree F. dispensed temperature (i.e., without a separate cooling process and associated components/energy), it serves to retard bacteria growth within the storage tank.

Figure 12:
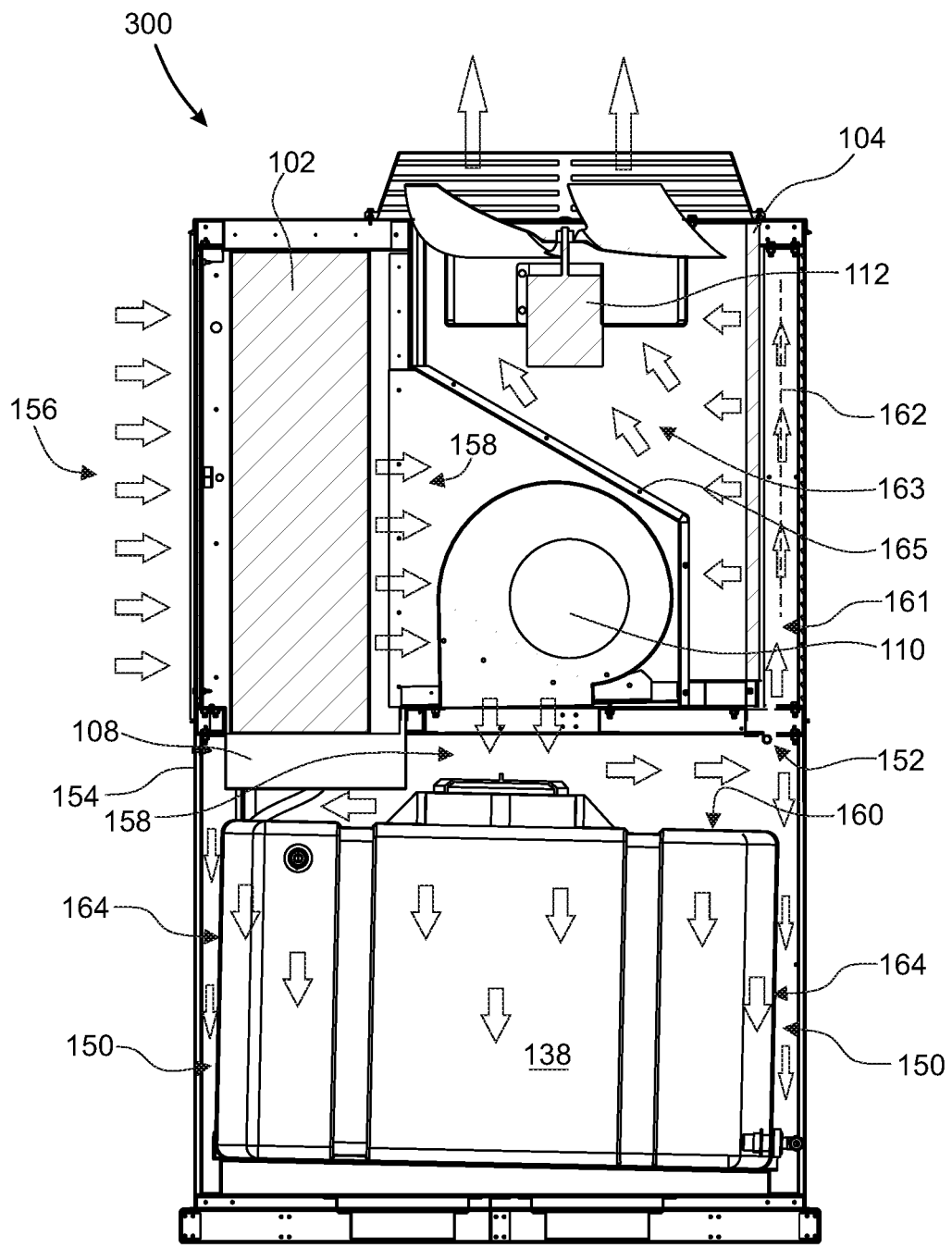
FIG. 12 is a diagrammatic cross-sectional view of the higher-capacity system of FIG. 11 illustrating the flow of air through various zones in the system, with particular attention drawn to a Coanda baffle which facilitates partial redirection of evaporator-cooled airflow upwards toward the condenser coil of the system.
Figure 13:
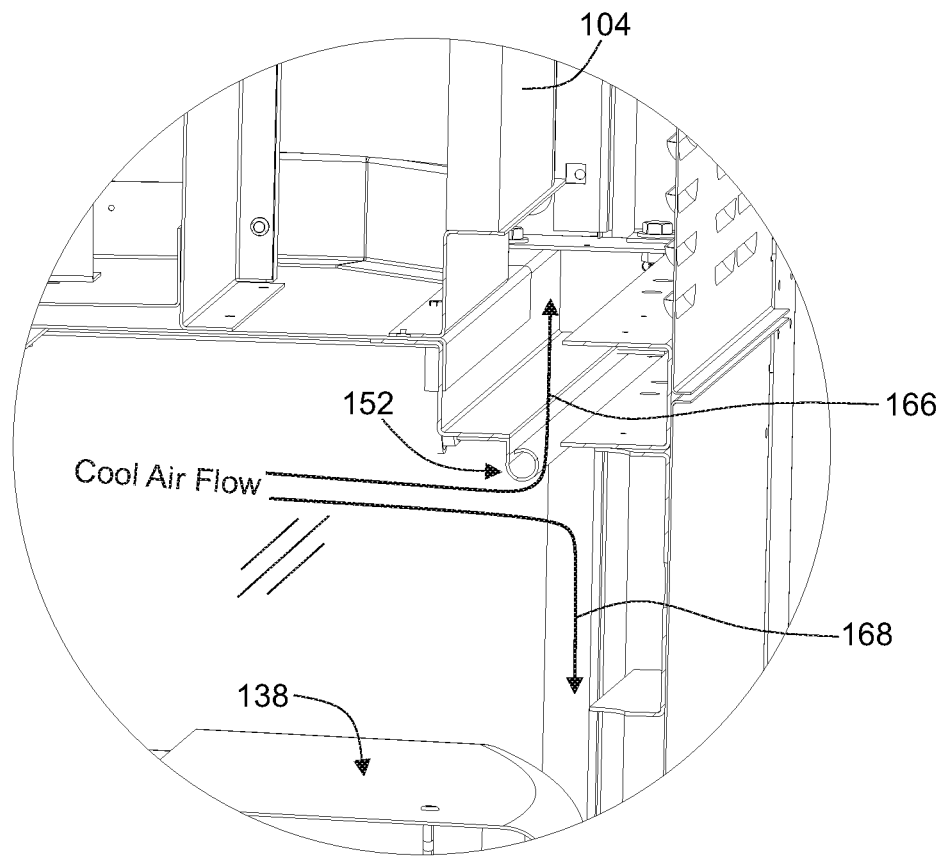
FIG. 13 is a magnified partial cross-sectional view of the higher-capacity system of FIG. 11 illustrating a Coanda baffle facilitating partial redirection of evaporator-cooled airflow upwards toward the condenser coil of the system.

Referring particularly to FIG. 12, in an example embodiment of the cool-air redirection subsystem and method, air leaves the fan (at location 154) and is discharged downwards onto the top of the tank 138. A vertical offset 148 is maintained between the fan discharge to allow the air flow to fully develop and flow around the tank. Cold air circulates around the sides of the tank within a horizontal spacing 150 that permits complete mixing and a uniform cool air temperature around the tank. Baffles 152, which may preferably be comprised of sheet metal components, on the underside of the condenser coil create a Coanda Effect. This effect splits the cold air flow, allowing, for example, 35-45% of the circulated cool air to move up towards the condenser coil 104 and 55-65% of the air to move downwards towards the tank 138.

Figure 11:
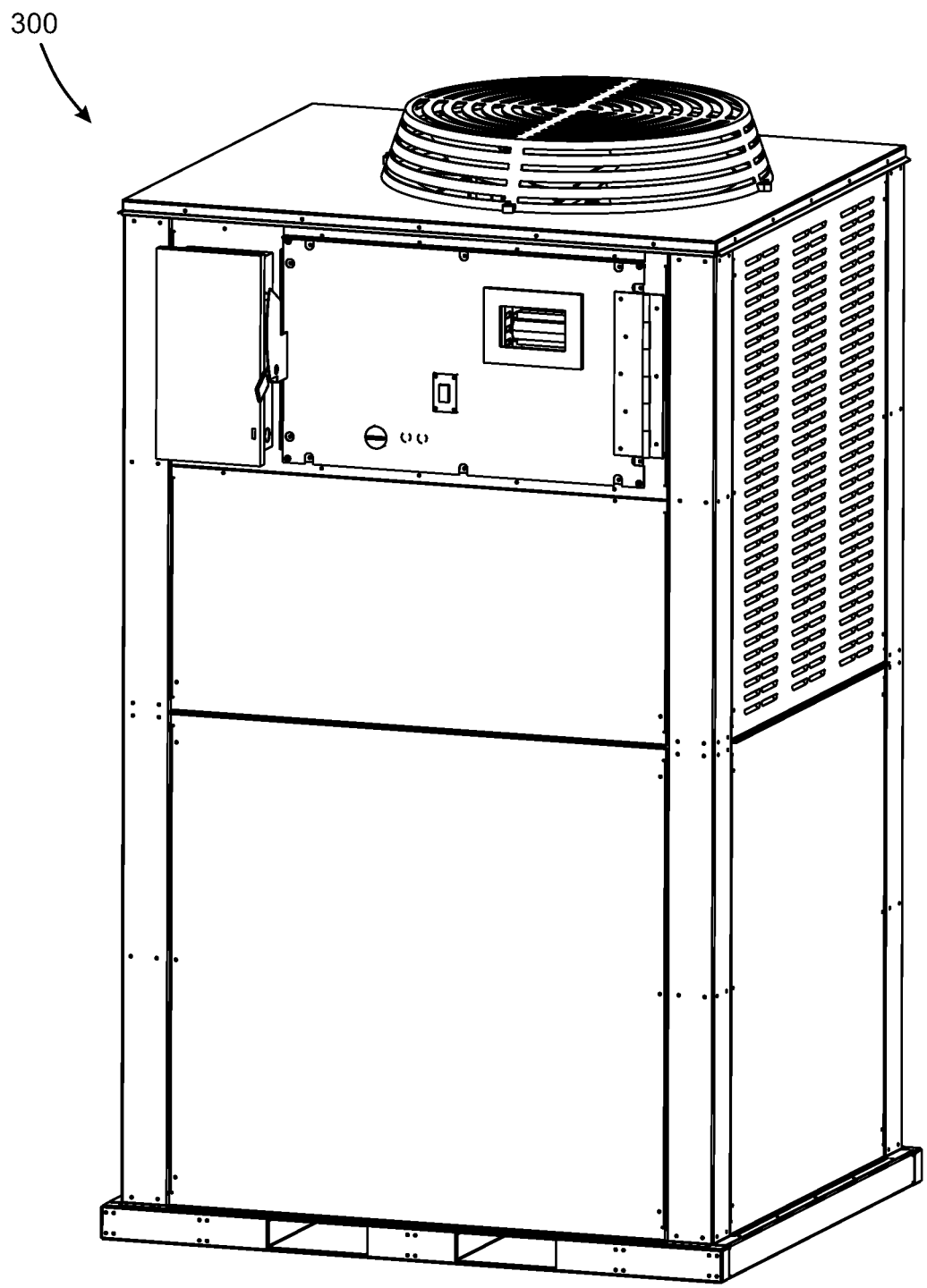
FIG. 11 is a diagrammatic perspective view of higher-capacity embodiment of an atmospheric water generator system.

With particular reference to the large-capacity (e.g., 100-gallon) AWG system example shown in FIGS. 11 and 12, a preferred vertical offset 148 of approximately 2-5 inches may be maintained between the tank and the discharge of the fan 110. In a large-capacity AWG system such as this, the circulation fan 110 may preferably be a direct drive, double-inlet, forward-curved 1 HP fan. A preferred horizontal spacing 150 of approximately 1-3 inches may be maintained between the frame of the machine 300 and the tank 138. A baffle 152 with a curved surface exposed to the flowing air causes the Coanda Effect to split the airflow between the condenser inlet and the tank 138.

With reference to FIG. 12, in this example embodiment, hot ambient air (e.g., 80° F.) enters on the left side of the section view. The ambient air is drawn over the cold evaporator coil 1-2 and the temperature drops (e.g., ~40° F.). The cooled air 158 moves through the fan 110 and is discharged down over the storage tank 138. As the air circulates around the storage tank, a portion of the air is turned upwards with the Coanda Baffle 152 and into the condenser coil 104. Finally, the warmer air 163 exiting the region of the condenser coil exists the AWG system, guided by a shroud 165 separating the evaporator-cooled air 158 from the condenser-warmed air 163.

Referring to FIG. 12, an embodiment of an atmospheric water generator 100 for operating in an environment with ambient air and generating potable water therefrom may comprise the following: (a) a water production element configured to transform water vapor from the ambient air to liquid water, the water production element including a condenser coil 104; (b) a storage tank 138 in water receiving communication with the water production element and having a first outer surface portion; (c) a fan element in air delivering communication with the first outer surface portion; and (d) a Coanda baffle 152 in airflow communication between the first outer surface portion and the condenser coil 104.

The condenser coil 104 may include one or more airflow inlet channels 161 in airflow communication with the Coanda baffle 152. In such case, the one or more airflow inlet channels 161 may extend along a channel axis 162, the channel axis and the first outer surface portion 148 being non-coplanar with respect to one another. Moreover, the storage tank 138 may include lateral outer surface portions 164 in non-coplanar airflow communication with the first outer surface portion 160. In such cases, the Coanda baffle 152 may be configured to direct a first portion 166 of airflow from the first outer surface portion 160 toward the condenser coil 104 such that a second portion 168 of the airflow from the outer surface portion 160 remains available to flow along one or more of the lateral outer surface portions 164. The one or more lateral outer surface portions may extend orthogonally with respect to the first outer surface portion.

As also illustrated in the embodiment shown in FIG. 12, the water production element may include an evaporator coil 102; and the fan element 110 may be disposed in airflow communication between the evaporator coil 102 and the first outer surface portion 160. An air discharge fan 112 may be disposed in airflow communication between the condenser coil 104 and an ambient environment external to the atmospheric water generator system 300.

Passive Heat Pipe Subsystem

Conventional atmospheric water generation is a comparably energy intensive form of water production. Industry estimates for the power cost of traditional city water is 1.0 kW×hr/gallon. Conventional AWGs struggle at be between 3-4 kW×hr/gallon. The reduction in temperature lowers the working load on the compressor and its energy consumption.

A passive heat pipe configuration may be employed in an embodiment of an AWG system to pre-cool (reduce of the temperature of) the influent air before it contacts the evaporator coils 102. This yields a savings in the AWG system's energy use by reducing the amount of work required to be performed by the compressor in order to drop the incoming ambient air temperature down to the dew point to generate the condensate.

Figure 14:
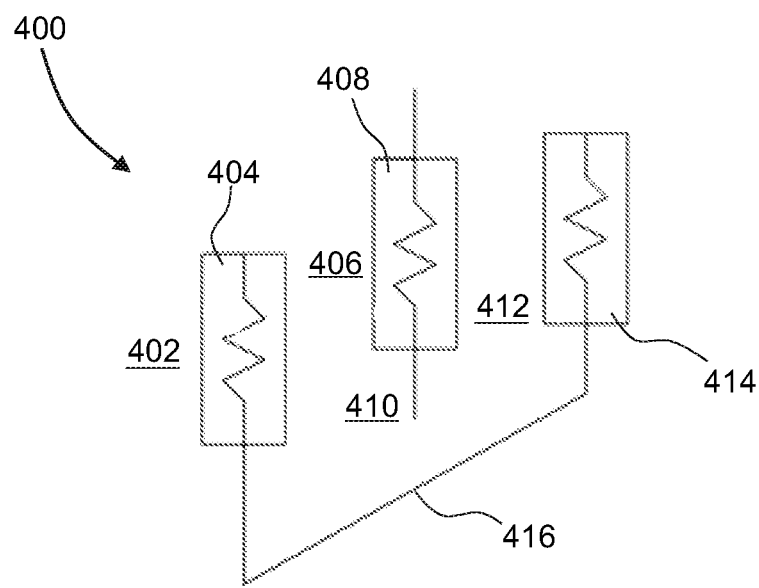
FIG. 14 is a schematic of a passive heat pipe subsystem which may be incorporated into certain embodiments of the atmospheric water generator systems described herein.

Referring to FIG. 14, a schematic of a heat piping subsystem 400 and method is shown. At location 402, ambient air (e.g., 80° F./0.01321 grain/lb.) enters the AWG system and encounters the first stage of the heat pipe. At 404, the cold surface of the first stage of the heat pipe reduces the temperature of the air. At 406, the cooler air (e.g., 65° F./0.01321 grain/lb.) approaches the evaporator coil at 408. This airstream is a reduced temperature, but similar moisture content. At 408, the evaporator coil spends the energy necessary to reduce the airstream temperature to the dew point so that liquid water can condense out of it. Since the air reaching the evaporator coil has been reduced (for example, from 80° F. to 65° F.) the amount of energy required is less. At 410, water condenses off of the evaporator coil. At 412, cold air, at the dew point temperature, is no longer required and is passed on to the second stage of the heat pipe. At 414, cold air passes over the surface of the heat pipe and condenses the refrigerant inside. This condensed refrigerant drains backwards to the first stage through pitched tubes 416 and repeats at 402. It is the passive non-mechanical recirculation of the refrigerant that makes this a low-energy consumption process.

Notably, heat pipes in the HVAC industry are typically designed with a low number (e.g., 6) fins per inch to remove moisture. The heat pipes developed for the present AWG system application may preferably have a much higher number (e.g., 12) fins per inch. The velocity of the air may also be optimized. For AWG applications, it is the velocity should preferably be closer to 400 feet per minute compared with the more conventional 200 fpm seen in other industries.

Variable Speed Fan

A variable speed fan may be implemented. Increasing the fan speed (e.g., of fan 110) increases the volume of air flowing over the cooling surfaces of the evaporator coils 102, which may be particularly useful at times of lower ambient temperature and humidity conditions. Contrastingly, when ambient conditions are particular favorable to water production, decreasing the fan speed results in greater water generating efficiency and a decrease in energy use.

Reversible Hot/Cold Lines

Atmospheric water generation machines often implement components and processes which aim to maintain a highly-sterile environment in which to store water after its production and before consumption by the user. Unfortunately, the tubing between this safe, clean, and sterile storage environment and the dispense point of the machine is often difficult or nearly impossible to clean automatically. The tubing between the water storage tank 114 and dispense point 142 of the AWG system can easily grow bacteria. By way of example, measurements show a difference of approximately 200 heterotrophic plate count (HPC) between the clean storage container and the dispense portion of conventional AWG machines. It have been experimentally discovered that the gain in HPC between the storage container and dispense primarily or only occurs in the cold dispense line. The high temperature of the hot dispense line generally prevented an increase in HPC.

Figure 15:
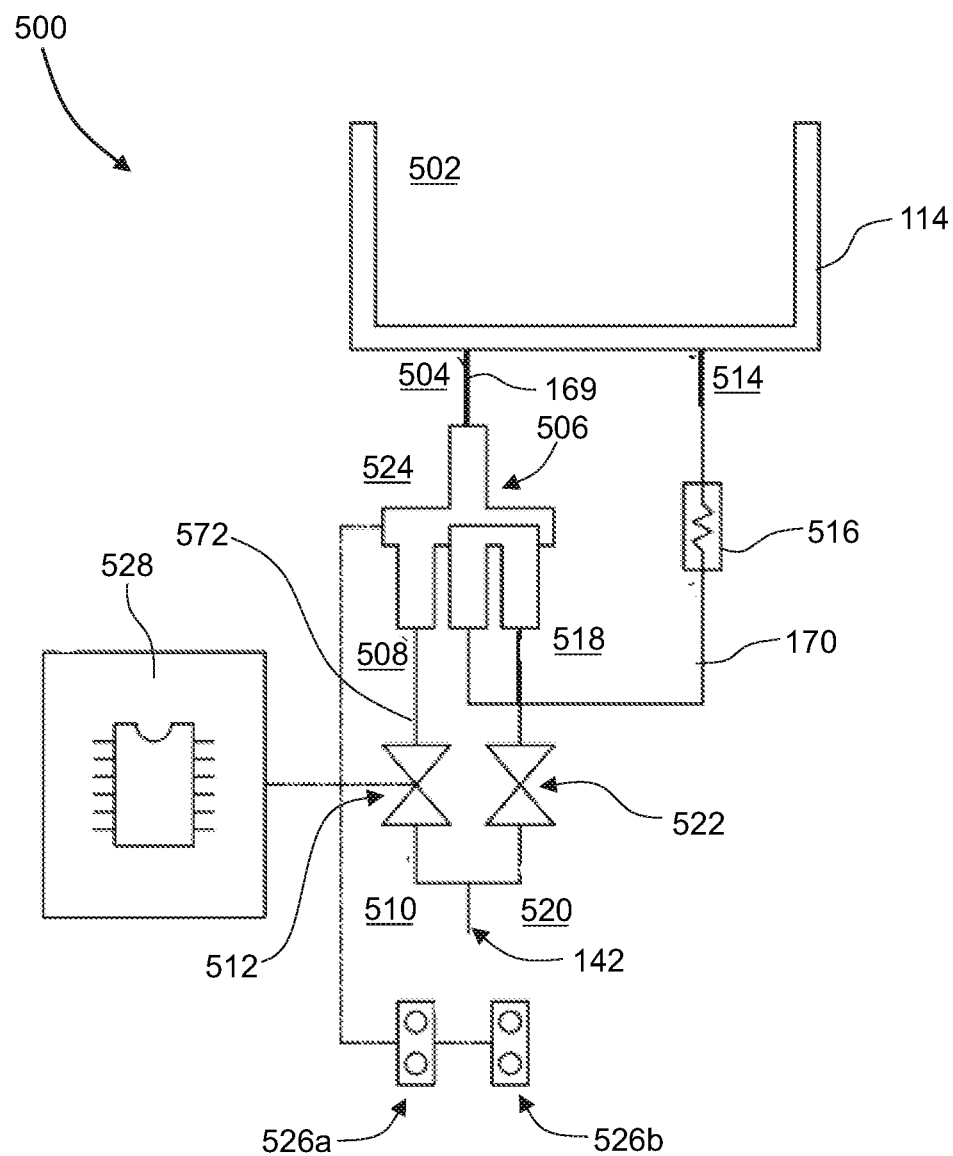
FIG. 15 is a schematic of a cold dispense line sterilization subsystem which may be incorporated into certain embodiments of the atmospheric water generator systems described herein.

In particular preferred embodiments of an improved AWG system 100, the hot and cold lines may periodically be reversed to "disinfect" the cold line with the hot water from the hot line. Components and processes associated with one example embodiment of a cold-dispense line sterilization subsystem 500 are illustrated in FIG. 15. At 502, water is stored inside a sterile container, such as a cold storage tank 114. At 504, cold water is drawn out of the tank and enters the reversing valve 506. At 508, when the reversing valve is deenergized the cold water flows through the left. At 510, after the reversing valve 506 the cold water leaves the unit through the first dispense valve 512. At 514, water is drawn out of the tank and into a heater 516. The dispensed hot water sanitizes tubing and enters the reversing valve 506. At 518 in the deenergized state the hot water enters on the bottom center and flows on the bottom right. At 520, after the reversing valve 506, the cold water leaves the unit through a second dispense valve 522. At 524, periodically the reversing valve will be energized. This causes the solenoid valve 506 inside to shift to the left. When this shift occurs the cold water entering from point 504 will now leave the reversing valve through point 518. The AWG system may have two dispense buttons (526a and 526b), one for hot and for cold water. To support a seamless customer experience the response of these buttons must adjust with the reversing valve or the user will get hot water when they press the cold button. A custom-built electronic control module 528 connects the reversing valve 506, solenoid valves 512 and 522, and dispense buttons and inverts the response of the buttons based on the energized status of the reversing valve. The electronic control module 528 may preferably periodically energize the reversing valve to ensure that hot water passes through both dispense lines to remove bacteria.

Embodiments of an atmospheric water generator 100 for operating in an environment with ambient air and generating potable water therefrom may comprise: (a) a water production element configured to transform water vapor from the ambient air to liquid water; (b) a water reservoir 114 for storage of the liquid water; (c) a reversing valve 506 actuatable between a first valve configuration and a second valve configuration; (d) a hot water line in fluid communication between the water reservoir and the reversing valve, the hot water line comprising a water heating element 516; (e) a cold water line in fluid communication between the water reservoir 114 and the reversing valve; (f) a water dispense outlet 142 at which water is dispensable from the generator 100; (g) a first dispense line in fluid communication between the reversing valve 506 and the water dispense outlet 142; (h) a first dispense valve 512 for controlling the flow of water through the first dispense line; (i) a second dispense line in fluid communication between the reversing valve 506 and the water dispense outlet 142; and (j) a second dispense valve 522 for controlling the flow of water through the second dispense line. When the reversing valve 506 is in its first valve configuration, the cold water line 169 is in fluid communication with the first dispense line 172 and the hot water line is in fluid communication with the second dispense line 174. When the reversing valve 506 is in its second valve configuration, the cold water line 169 is in fluid communication with the second dispense line 174 and the hot water line 170 is in fluid communication with the first dispense line 172.

A flow-reversal control module 528 may be configured to periodically switch the reversing valve 506 between its valve configurations. In certain preferred embodiments, the frequency of the periodic switching may be between one hour and one week.

An AWG system 100 with cold dispense line sterilization subsystem may further comprise a cold water dispense button and a hot water dispense button. In certain such embodiments, when the reversing valve is in its first valve configuration, the flow reversal control module is adapted to provide for opening of the first dispense valve upon activation of the cold water button, and opening of the second dispense valve upon activation of the hot water button. Similarly, when the reversing valve is in its second valve configuration, the flow reversal control module provides for opening of the second dispense valve upon activation of the cold water button, and opening of the first dispense valve upon activation of the hot water button.

Water Productivity Meter

Preferred embodiments of an AWG system may comprise both a temperature sensor and humidity sensor. Data from both of those sensors may be analyzed against a psychrometric chart (e.g., programmed within an app and MCU of the AWG system), thereby providing the users with a real-time picture of how much water the system is capable of generating under the current conditions.

Office Water Cooler Messaging Function

Certain preferred embodiments of an AWG system may be programmed (e.g., via a touch-screen interface 124) to allow office users to communicate with one another through the interactive tablet on the machine. For example, the office manager may program the tablet to remind the office workers about a big presentation in the large conference room at 3:00 PM. The associated program (e.g., app) may provide a drop-down keyboard and a side scroll panel reflecting all back-and-forth small message exchanges for the day, week, etc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An atmospheric water generator for operating in an environment with ambient air and generating potable water therefrom, the atmospheric water generator comprising:
(a) a water production element configured to transform water vapor from the ambient air to liquid water;
(b) a first tank for storage of the liquid water;
(c) a UV emitter configured to emit UV light within the first tank;
(d) a UV sensor configured to measure the intensity of the UV light emitted from the UV emitter;
(e) a UV controller configured to perform a UV dosing process, the UV dosing process comprising:
 (i) establishing a target UV dosage;
 (ii) activating the UV emitter;
 (iii) receiving a measured intensity from the UV sensor;
 (iv) calculating an activation period based on the measured intensity and the target UV dosage; and
 (v) deactivating the UV emitter upon completion of the UV activation period;
(f) a second tank for storage of the liquid water; and
(g) a water pump configured to pump liquid water from the first tank to the second tank;
wherein the UV controller is further configured such that, for each time liquid water is pumped from the first tank to the second tank, the UV controller performs the UV dosing process prior to said pumping.

2. An atmospheric water generator for operating in an environment with ambient air and generating potable water therefrom, the atmospheric water generator comprising:
(a) a water production element configured to transform water vapor from the ambient air to liquid water;
(b) a first tank for storage of the liquid water;
(c) a UV emitter configured to emit UV light within the first tank;
(d) a UV sensor configured to measure the intensity of the UV light emitted from the UV emitter;
(e) a UV controller configured to perform a UV dosing process, the UV dosing process comprising:
 (i) establishing a target UV dosage;
 (ii) activating the UV emitter;
 (iii) receiving a measured intensity from the UV sensor;
 (iv) calculating an activation period based on the measured intensity and the target UV dosage; and
 (v) deactivating the UV emitter upon completion of the UV activation period;
(f) a second tank configured to receive water from the first tank;
(g) a second UV emitter configured to emit UV light within the second tank;
(h) a second UV sensor configured to measure the intensity of the UV light emitted from the second UV emitter; and
(i) a second UV controller configured to perform a second UV dosing process, the second UV dosing process comprising:
 (i) establishing a second target UV dosage;
 (ii) activating the second UV emitter;
 (iii) receiving a second measured intensity from the second UV sensor;
 (iv) calculating a second activation period based on the second measured intensity and the second target UV dosage; and
 (v) deactivating the second UV emitter upon completion of the second UV activation period.

* * * * *